United States Patent
Ramsten et al.

(10) Patent No.: US 8,412,098 B2
(45) Date of Patent: Apr. 2, 2013

(54) ELECTRONIC EQUIPMENT FOR A WIRELESS COMMUNICATION SYSTEM AND METHOD FOR OPERATING AN ELECTRONIC EQUIPMENT FOR A WIRELESS COMMUNICATION SYSTEM

(75) Inventors: Fredrik Ramsten, Malmö (SE); Anette Sandegard, Malmö (SE); Kristoffer Aberg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1294 days.

(21) Appl. No.: 11/912,427

(22) PCT Filed: Apr. 25, 2006

(86) PCT No.: PCT/EP2006/003833
§ 371 (c)(1),
(2), (4) Date: May 7, 2008

(87) PCT Pub. No.: WO2006/114287
PCT Pub. Date: Nov. 2, 2006

(65) Prior Publication Data
US 2008/0287060 A1    Nov. 20, 2008

Related U.S. Application Data

(60) Provisional application No. 60/677,557, filed on May 4, 2005.

(30) Foreign Application Priority Data

Apr. 25, 2005 (EP) .................................. 05008999

(51) Int. Cl.
*H04B 7/00* (2006.01)
*H04M 1/00* (2006.01)

(52) U.S. Cl. .................... 455/41.2; 455/41.3; 455/556.2
(58) Field of Classification Search ................. 455/41.2, 455/41.3, 415, 550.1, 555, 556.1, 556.2
See application file for complete search history.

(56) References Cited

U.S. PATENT DOCUMENTS
(Continued)

FOREIGN PATENT DOCUMENTS

| DE | 100 12 057 A1 | 9/2001 |
|---|---|---|
| JP | 2001-100972 | 4/2001 |

(Continued)

OTHER PUBLICATIONS

Jose Luis Martinez Flores et. al, Performace of RFID Tags in Near and Far Field, IEEE, 2005.*

(Continued)

*Primary Examiner* — Nhan Le
(74) *Attorney, Agent, or Firm* — Renner, Otto, Boisselle & Sklar, LLP

(57) ABSTRACT

The present invention relates to an electronic equipment for a wireless communication system comprising a near field interface (4) for exchanging contact information with at least one further electronic equipment via near field communication, said contact information serving for communicating within the wireless communication system, a group editing means (3) for creating a group of contact information comprising at least the received contact information, whereby each contact information of the group relates to an electronic equipment, and a communication means (8) for setting up a communication within the wireless communication system to the group of electronic equipments in accordance with the group of contact information. The present invention further relates to a method for operating such an electronic equipment.

24 Claims, 2 Drawing Sheets

U.S. PATENT DOCUMENTS

| | | | |
|---|---|---|---|
| 7,027,836 B2* | 4/2006 | Zacks et al. | 455/557 |
| 7,747,218 B2 | 6/2010 | Sasai et al. | |
| 2002/0132585 A1 | 9/2002 | Palermo et al. | |
| 2004/0203381 A1* | 10/2004 | Cahn et al. | 455/41.2 |
| 2004/0240403 A1 | 12/2004 | Kotzin | |
| 2004/0242250 A1* | 12/2004 | Sasai et al. | 455/502 |
| 2005/0186908 A1* | 8/2005 | Shin et al. | 455/41.2 |
| 2005/0250445 A1* | 11/2005 | Hansson | 455/41.2 |
| 2006/0047793 A1* | 3/2006 | Agrawal et al. | 709/221 |

FOREIGN PATENT DOCUMENTS

| | | |
|---|---|---|
| JP | 2002-261702 | 9/2002 |
| JP | 2004-153438 | 5/2004 |
| JP | 2004-180300 | 6/2004 |
| RU | 2169437 C1 | 7/2000 |
| WO | 02/070088 A1 | 9/2002 |
| WO | 03/034661 A1 | 4/2003 |

OTHER PUBLICATIONS

International Search Report for PCT/EP2006/003833, dated Aug. 9, 2006.

Notification of transmittal of the International Search Report and the Written Opinion of the International Searching Authority, or the Declaration, dated Aug. 17, 2006.

Notification of Transmittal of the International Preliminary Report on Patentability, dated Aug. 6, 2007.

"Manual of Siemens M65"; 2004; pp. 20, 22, 30, 46 and English translation thereof.

Matsuo Takashi Application Development Guide Utilizing FeliCa, Computer & Network LAN, Japan: Ohmsha Press, Jan. 1, 2005, vol. 23, No. 1, pp. 15-21.

* cited by examiner

ELECTRONIC EQUIPMENT FOR A WIRELESS COMMUNICATION SYSTEM AND METHOD FOR OPERATING AN ELECTRONIC EQUIPMENT FOR A WIRELESS COMMUNICATION SYSTEM

TECHNICAL FIELD OF THE INVENTION

The present invention relates to an electronic equipment for a wireless communication system. Specifically, the present invention relates to the problem of handling groups of contacts.

DESCRIPTION OF RELATED ART

In recent times an increasing number of applications have been designed that can be used by groups of users, such as networked games, chat rooms or conference calls. Further, efforts have been made to adapt those group applications also to electronic equipments for wireless communication systems, such as mobile telephones, pagers, personal digital assistants, electronic organisers and so forth.

One into this direction is the software platform Open Trek, which is primarily intended to assist the development of multi-player networked games on electronic equipments. Open Trek is similar to game development environments on stationary PCs, but is fully optimised to work with mobile devices. Open Trek uses a peer to peer approach with no central server. It is the devices themselves that form a peer to peer network based on what other devices are available on the current wireless network. As this technology uses WLAN, IR or Bluetooth to connect to the other users, Open Trek has the inherent problems of those wireless connectivity technologies in searching for and selecting other group members.

SUMMARY

The general problem with state of the art electronic equipments for wireless communication systems as outlined above is that for participating in group applications and to be able to address a group of people, either several individual addresses must be defined or a send list or group must be defined in an application like a phone book or a buddy list. This requires a high effort by the user as the use of the commonly available means, e.g. pressing keys to make menu selections and entering address information, do not allow to easily and quickly create a group. Further, although a user may put up with the effort of defining a group, this group would have a set of static members, which is not applicable to the personal networks of users, which are fairly fluid with members being added or deleted dynamically and over time. There are also fairly many occasions when a group needs to be defined quickly and on the spot, e.g. when transferring an object to several recipients or conducting a phone conference.

The object of the present invention is therefore to provide an electronic equipment for a wireless communication system as well as a method for operating such an electronic equipment, which enable an easy and quick creation of groups in order to set up a wireless communication within the people of the group.

The above-mentioned object is achieved by an electronic equipment for a wireless communication system according to claim 1.

The electronic equipment according to the present invention comprises a near field interface for exchanging contact information with at least one further electronic equipment via near field communication, said contact information serving for communicating within the wireless communication system, a group editing means for creating a group of contact information comprising at least the received contact information, whereby each contact information of the group relates to an electronic equipment, and a communication means for setting up a communication within the wireless communication system to the group of electronic equipments in accordance with the group of contact information.

The above-mentioned object is further achieved by a method for operating an electronic equipment for a wireless communication system according to claim 13.

The method according to the present invention comprises the steps of exchanging contact information with at least one further electronic equipment via near field communication, said contact information serving for communicating within the wireless communication system, creating a group of contact information comprising at least the received contact information, whereby each contact information of the group relates to an electronic equipment, and setting up a communication within the wireless communication system to the group of electronic equipments in accordance with the group of contact information.

In the context of the present application and the present invention, the term "electronic equipment for a wireless communication system" includes any kind of portable radio communication equipment. The term "portable radio communication equipment" includes all equipments such as mobile telephones, mobile cell phones, pagers, personal digital assistants, communicators, i.e. electronic organisers, smartphones or the like. The term "wireless communication system" relates to any kind of communication or telecommunication system which enables the wireless transfer of information, including but not being limited to Bluetooth, Infrared or wireless LAN and in particular including cellular communication systems as e.g. the GSM and/or the UMTS or any other equivalent system.

It should be emphasised that the term "comprises/comprising" when used in this specification is taken to specify the presence of stated features, integers, steps of components but does not preclude the presence or addition of one or more other features, integers, steps, components or groups thereof.

Preferably, further contact information is exchanged during the communication within the wireless communication system set up by the communication means.

Preferably, the operating distance of the near field communication lies within a range of 0 to 30 cm.

Further, preferably the near field interface operates at a radio frequency (RF) range of 13.56 MHz.

Advantageously, the contact information is stored in a contact database.

Further advantageously, a state of the electronic equipment is defined by a user via an input means.

Preferably, the type of the exchanged contact information depends on the state of the electronic equipment.

Further, preferably the type of communication set up by the communication means depends on the type of the exchanged contact information.

The type of communication set up by the communication means may depend on a selection by the user.

Preferably, the communication is set up by the communication means immediately after receiving the contact information via the near field interface.

The communication may be set up by the communication means at a time selected by the user.

Advantageously, the user can change the group of contact information by an input means.

An output means can provide a feedback to the user upon exchanging the contact information via the near field interface.

BRIEF DESCRIPTION OF THE DRAWINGS

Embodiments of the invention will now be described, by way of example only, with reference to the accompanying drawings, in which.

DETAILED DESCRIPTION OF EMBODIMENT

Figure 1:
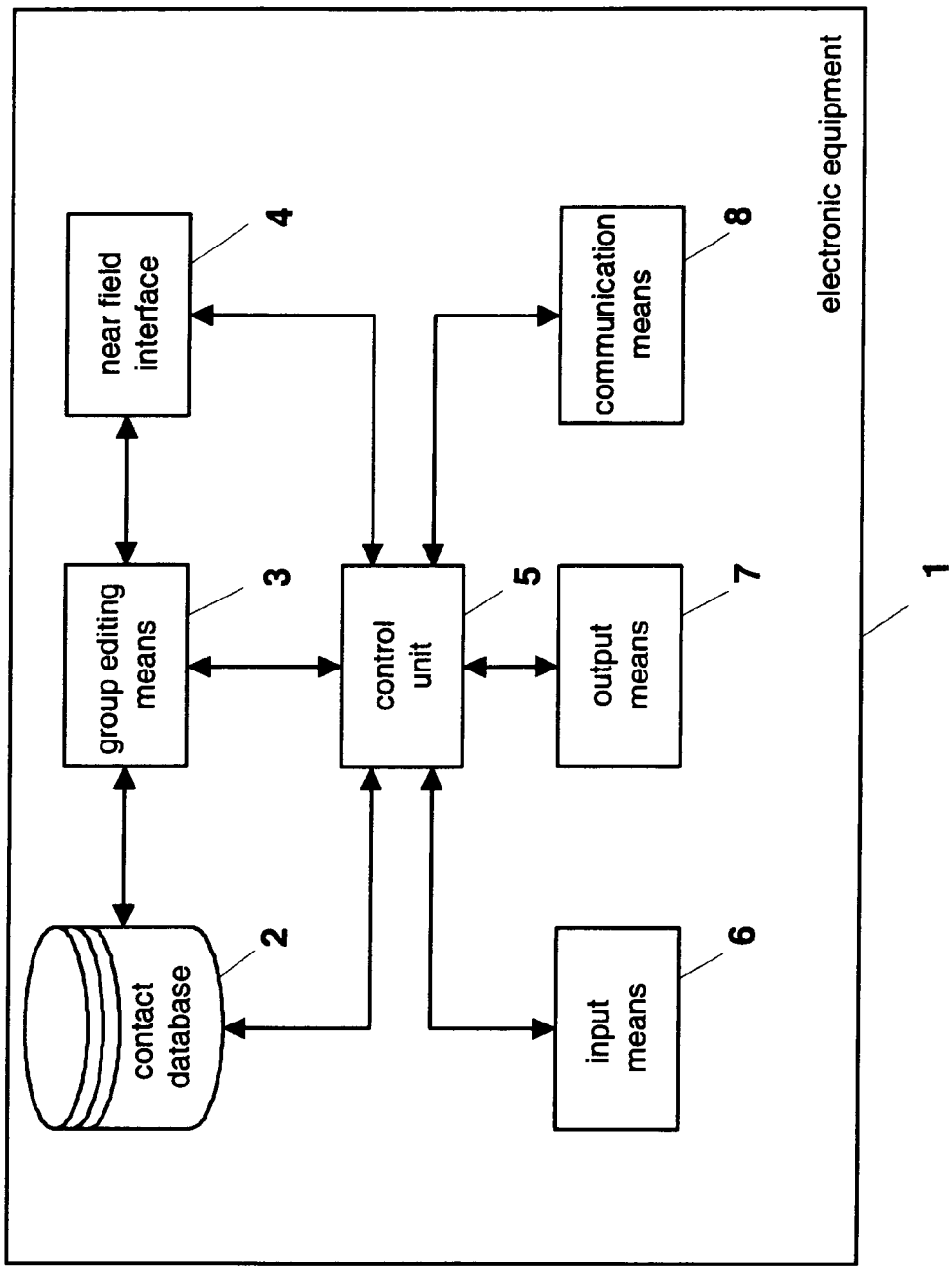
FIG. 1 is a block diagram showing schematically the elements of the electronic equipment according to the present invention and FIG. 2 is a flow chart showing schematically the process steps according to the method of present invention.

FIG. 1 shows a schematic block diagram of an electronic equipment 1 according to the present invention. The electronic equipment 1 is able to transmit and receive information in a wireless communication system, such as Bluetooth, Infrared, wireless LAN, the UMTS, the GSM or any other available wireless cellular telecommunication system.

For the transmission and reception of wireless signals in the telecommunication system, the electronic equipment 1 comprises a communication means 8 which in turn comprises all components necessary for receiving and transmitting signals within the telecommunication system. For example, the communication means 8 may comprise an antenna which is connected to a transmitter/receiver means, which e.g. can be embodied as an high frequency (HF) unit in case of a GSM or a UMTS system. The transmitter/receiver means is connected to further processing devices necessary for (de)modulating, (de)coding and so forth the received information signals depending on the wireless communication system in which the information signals are being transmitted and received. It is to be noted, that the electronic equipment 1 in practice comprises all necessary means and units to be operated in the respective wireless communication system. For the sake of clarity, FIG. 1 and the present description only show and relate to functionalities which are necessary to understand the present invention.

The electronic equipment 1 further comprises an input means 6 for inputting information, whereby the input means 6 may be a key pad, a touch pad, means for voice recognition, a camera, an interface for connecting the electronic equipment 1 to any other device via cable or wireless connection or any other means enabling the input of information. The electronic equipment 1 further comprises an output means 7 serving for outputting information. The output means 7 hereby may be a display, loudspeakers, an interface for connecting the electronic equipment 1 to any other device via cable or wireless connection or any other means enabling the output of information. In case the electronic equipment 1 is a portable cell phone, then the output means 7 can e.g. be a usual cell phone display and the input means 6 corresponds to the usual input keys enabling a user to input numbers, characters and symbols.

The electronic equipment 1 further comprises a control unit 5, which can e.g. be embodied in a microprocessor, central processing unit or the like. The central control unit 5 controls the operation of the electronic equipment 1. Therefore, the control unit 5 is connected to the input means 6, the output means 7 and the communication means 8.

The control unit 5 is further connected to a contact data base 2 for storing data, information and/or software codes necessary for setting up a communication within the wireless telecommunication system. The contact data base 2 therefore comprises an information source identification memory, e.g. a phone book memory, for storing information source identification information, e.g. phone numbers, e-mail addresses, IP addresses and the like, and additional information relating to the identity of the information sources such as names, images and the like.

The electronic equipment 1 further comprises a near field interface 4 for communicating via a near field communication with other electronic equipments. The near field interface 4 is able to communicate with at least one further near field interface over short distances. In one embodiment the known near field communication technique may be employed for the near field communication but also any other technique for communicating over short distances may be used. The near field communication (NFC) technique bases on the idea of an intuitive way of connecting objects simply by holding them next to each other without a preceding exchange of identification information or the like being necessary. That means that if two electronic equipments each having a near field interface are close together they are able to communicate with each other via near field communication. Preferably, the near field interfaces operate in the unregulated RF band of 13.56 MHz. This means that no restrictions are applied and no licenses are required for the use of NFC devices in this RF band. Of course, each country imposes certain limitations on the electromagnetic emissions in this RF band. The limitations mean that in practice the distance at which the devices can connect to each other is restricted and this distance may vary from country to country. Generally speaking, the operating distance is up to 30 cm.

With the nearfield interface 4 according to the present invention information can be exchanged with other electronic equipments which are needed for setting up a communication within the wireless communication system by the communication means 8. That means that e.g. telephone numbers, e-mail addresses or the like can be exchanged via the nearfield interface 4 and further be stored in the contact data base 2. It is to be noted, that the present invention is not restricted to the NFC technique and its specific technical embodiments, but may employ any other communication technique for communication over short distances.

The electronic equipment 1 further comprises a group editing means 3 for creating groups of contacts out of the contacts stored in the contact data base 2, which will be explained in detail in the following. The control unit 5 is further also connected to the contact database 2, the group editing means 3 and the near field interface 4.

The main idea underlying the present invention is as follows: When holding together at least two electronic equipments 1 according to the present invention each having a near field interface 4 enabling the communication via near field communication, then contact information necessary for setting up a communication via the wireless communication system can be exchanged between the electronic equipments. Such contact information may e.g. be a phone number, an address for sending a short message, an e-mail or data content or the like. Specifically, if more than two electronic equipments are brought together in order to communicate via the nearfield interfaces 4, then all the electronic equipments can exchange the respective information with each other. The received information is then stored in the contact data base 2 and the group editing means 3 creates a group of contacts comprising at least the contacts which have been received via the nearfield communication from the other electronic equipments. The user further has the possibility via an input means 6 to change the group of contacts, that is to add further contacts already stored in the data base 2 or to delete contacts from the group. The communication means 8 then immediately or at some later point sets up a communication, e.g. sets up a telephone conference or sends a message, to the group of electronic equipments via the wireless telecommunication system. With this mechanism according to the present invention a group for communication can be simply created just by holding the electronic equipments together without the necessity for each and every one of the users to input the contact information via a menu into the contact data base.

In a further embodiment the exchange of contact information is not exclusively done over the near field communication but also partly over the communication within the wireless communication system. That means, that only some contact information necessary to bootstrap the communication within the wireless communication system, e.g. Bluetooth, GSM or the like, is exchanged via near field communication and that further contact information, e.g. vCards containing information like pictures, is then exchanged via the wireless communication system, thereby utilising the faster data rate connection.

The known NFC protocol is based on a wireless interface connecting two parties using a peer-to-peer communication protocol. The NFC protocol distinguishes between the Initiator and the Target of the communication. Any device may be either an Initiator or a Target. The Initiator, as follows from the name, is the device that initiates and controls the exchange of data. The Target is the device that answers the request from the Initiator. The NFC protocol also distinguishes between two modes of operation: An active mode and a passive mode. All devices support both communication modes. The distinction is as follows: In the active mode of communication both devices generate their own RF field to carry the data. In the passive mode of communication only one device generates the RF field while the other device uses load modulation to transfer the data and the protocol specifies that in the passive mode of communication the Initiator is the device responsible to generate the RF field.

The NFC protocol uses different modulation and bit encoding schemes depending on the speed. While establishing the communication, the Initiator starts the communication in a particular mode at a particular speed. The Target determines the current speed and the associated low-level-protocol automatically and answers accordingly. The communication is terminated either on the command from the application, e.g. from the messaging or calling application, or when the devices move out of range.

For exchanging contact information between more than two devices, the NFC protocol has to be adapted accordingly. In the active mode every device sends its contact information and each device continues with the near field communication until for a predetermined time no new contact information is received or until a command is received from the application, e.g. when the message of a message application has been sent. In the passive mode the communication is set up by the Initiator. In this case it is also possible for the Initiator to request only specific contact information, e.g. only the phone number or only the e-mail address. The other devices then answer accordingly.

Figure 2:
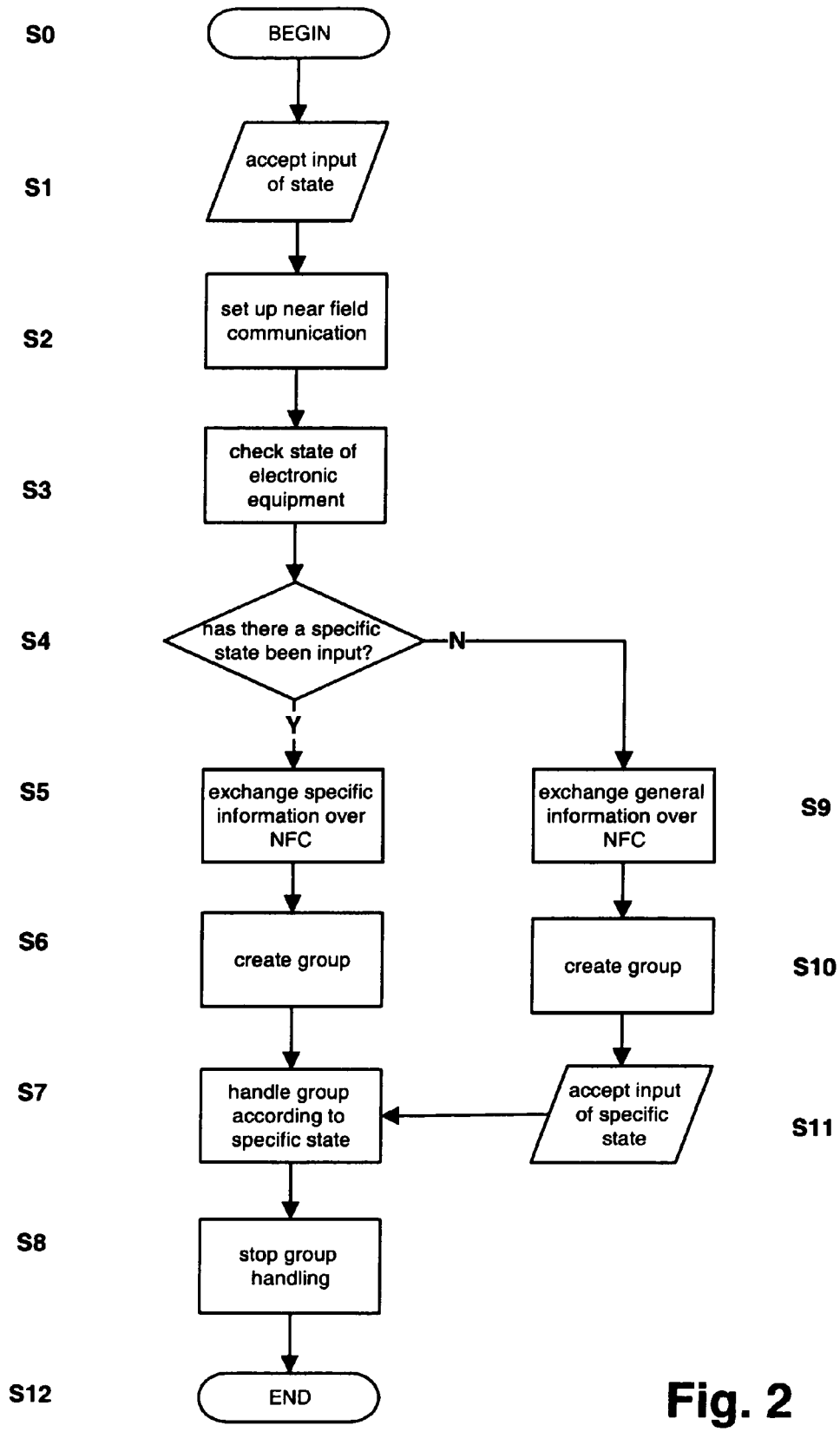

The process of the method according to the present invention will be explained in detail with reference to FIG. 2. The process starts in step S0 e.g. with switching on the electronic equipment 1. In the next step S1 the user can input a state for the electronic equipment 1 via the input means 6. The user can either input a basic state, e.g. an idle mode of the electronic equipment 1, or some specific state e.g. a messaging application, the exchange of v-cards, push-to-talk or a voice/video phone conference application. In the next step S2 a near field communication between the electronic equipment 1 and at least one further electronic equipment is triggered by simply holding the electronic equipments together, e.g. to a distance of up to 30 cm. In the next step S3 the electronic equipment 1 checks the state of the electronic equipment 1 entered by the user in step S1. In step S4 the electronic equipment 1 then decides if a specific state as has been explained above has been input. If this is the case, then the electronic equipment 1 in step S5 sets up a passive or active mode NFC, requests the specific information and exchanges the specific information with the at least one further electronic equipment over the NFC relating to the specific state entered in step S1. Such a contact information relating to a specific state can be e.g. an address for messaging or a phone number. After receiving the contact information the electronic equipment 1 stores the contact information in the contact data base 2. After the exchange of the specific information over the NFC the group editing means 3 in step S6 creates a group of contacts, whereby each contact relates to one further electronic equipment to which the electronic equipment 1 has recently set up a near field communication via the near field interface 4. In addition, then the user via the input means 6 has the possibility to change the created group, that is to add further contact information or to delete contact information. Hereby, the added contact information may be either been stored in the contact database 2 or may be input manually by the user.

Otherwise, if in step S4 the electronic equipment 1 has decided that the user has not input a specific state input, i.e. the user has input a basic state in step S1, then the electronic equipment in step S9 exchanges general information over the NFC with the other devices. This can be accomplished either in a passive or an active mode of the NFC. In step S10 the group editing means 3 creates a more generic group that can be used for any purpose, e.g. parts of it can be used for addressing when conducting a conversation with the other contacts in the group using messaging application. In the next step S11 the user then has the possibility to now input a specific state in order to decide how to use the created generic group. In addition, then the user via the input means 6 has the possibility to change the created group, that is to add further contact information or to delete contact information. Hereby, the added contact information may be either been stored in the contact database 2 or may be input manually by the user.

For example, the user can choose a messaging application so that a message communication is set up to the created group.

The process then in every case goes to step S7 where the group is handled according to the specific state input, that is the communication means 8 sets up a communication to all the electronic equipments of the group via the wireless telecommunication system and according to the specific state, that is the communication means 8 either sends a message, exchanges v-cards or puts up a phone conference or the like. Hereby, the communication may either be set up immediately or at a later time. The point in time may be either automatically defined by the application or manually by the user via the input means 6. In case the communication is set up at a later time, then the created group is stored in the contact database 2 for later use. In the next step S8 the group handling is stopped, that is the communication means 8 terminates the communication set up in the previous step S7. The process ends in step S12 e.g. with switching off the electronic equipment 1.

Further, according to the present invention, it is possible that the electronic equipment 1 and the implemented group editing means 3 handle more than one group at a time. If e.g.

in a group of several electronic equipments a first electronic equipment sends a request for exchanging contact information relating to a message application and a second electronic equipment requests contact information for setting up a phone conference, then in each electronic equipment being part of the group two groups are created, whereby one group relates to the message application and the other group relates to the phone conference. Also during the nearfield communication information relating to both types of groups are exchanged.

This allows to handle electronic equipments being in different states. In this case either general information is exchanged or a superset information is exchanged based on the specific states of the electronic equipments. E.g. if one electronic equipment is in a messaging state and one in a videotelephone state, contact information relating to messaging and videotelephone applications is exchanged, allowing subsequent selection of either mode of communication. Or general information is exchanged as in the basic state.

Further, with the present invention it is possible to add group members during an ongoing communication. If for example a first and a second user are having a telephone conversation, then a third user can join by holding his electronic equipment near to the electronic equipment of either the first or the second user. Thereby, during the ongoing telephone conversation contact information between the electronic equipments are exchanged and then a conference conversation between all three users can be set up.

In another embodiment instead of defining a specific state by the user, one of the electronic equipments can act as an administrator and is responsible for the choice of the communication channel.

It is possible to output information to the user via the output means 7 in order to notify the user when the contact information over the NFC has been exchanged. In yet another embodiment, an auto-accept setting can be chosen, hence no feedback information regarding the exchanged contact information is provided.

The invention claimed is:

1. An electronic equipment for a wireless communication system comprising:
   a near field interface for exchanging contact information with at least one further electronic equipment via near field communication, said contact information comprising a target address of the respective further electronic equipment within the wireless communication system and serving for communicating within the wireless communication system,
   a group editing means for creating a group of contact information comprising at least the received contact information, whereby each contact information of the group relates to an electronic equipment, and
   a communication means for setting up a communication within the wireless communication system to the group of electronic equipments in accordance with the group of contact information,
   wherein a type of communication set up by the communication means depends on a selection by the user.

2. The electronic equipment according to claim 1, wherein further contact information is exchanged during the communication within the wireless communication system set up by the communication means.

3. The electronic equipment according to claim 1, wherein the operating distance of the near field communication lies within a range of 0 to 30 cm.

4. The electronic equipment according to claim 1, wherein the near field interface operates at a radio frequency (RF) of approximately 13.56 MHz.

5. The electronic equipment according to claim 1, wherein the contact information is stored in a contact database.

6. The electronic equipment according claim 1, wherein a state of the electronic equipment is defined by a user via an input means.

7. The electronic equipment according to claim 6, wherein the type of the exchanged contact information depends on the state of the electronic equipment.

8. The electronic equipment according to claim 7, wherein the type of communication set up by the communication means depends additionally on the type of the exchanged contact information.

9. The electronic equipment according to claim 1, wherein the communication is set up by the communication means immediately after receiving the contact information via the near field interface.

10. The electronic equipment according to claim 1, wherein the communication is set up by the communication means at a time selected by the user.

11. The electronic equipment according to claim 1, wherein the user can change the group of contact information by an input means.

12. The electronic equipment according to claim 1, wherein an output means provides a feedback to the user upon exchanging the contact information via the near field interface.

13. A method for operating an electronic equipment for a wireless communication system, comprising the steps of:
   exchanging contact information with at least one further electronic equipment via near field communication, said contact information comprising a target address of the respective further electronic equipment within the wireless communication system and serving for communicating within the wireless communication system,
   creating a group of contact information comprising at least the received contact information, whereby each contact information of the group relates to an electronic equipment,
   setting up a communication within the wireless communication system to the group of electronic equipments in accordance with the group of contact information, and
   setting up a type of communication depending on a selection by the user.

14. The method according to claim 13, comprising exchanging further contact information during the communication within the wireless communication system.

15. The method according to claim 13, comprising storing the contact information in a contact database.

16. The method according to claim 13, comprising accepting an input of state of the electronic equipment via an input means.

17. The method according to claim 13, comprising exchanging a type of contact information depending on the state of the electronic equipment.

18. The method according to claim 17, comprising setting up the type of communication depending additionally on the type of the exchanged contact information.

19. The method according to claim 13, comprising setting up the communication immediately after receiving the contact information.

20. The method according to claim 13, comprising setting up the communication at a time selected by the user.

21. The method according to claim 13, comprising changing the group of contact information by the user.

22. The method according to claim 13, comprising providing a feedback to the user upon exchanging the contact information via the near field interface.

23. An electronic equipment for a wireless communication system comprising:
a near field interface for exchanging contact information with at least one further electronic equipment via near field communication, said contact information comprising a target address of the respective further electronic equipment within the wireless communication system and serving for communicating within the wireless communication system,
a group editing means for creating a group of contact information comprising at least the received contact information, whereby each contact information of the group relates to an electronic equipment, and
a communication means for setting up a communication within the wireless communication system to the group of electronic equipments in accordance with the group of contact information,
wherein a state of the electronic equipment is defined by a user via an input means and a type of the exchanged contact information depends on the state of the electronic equipment.

24. A method for operating an electronic equipment for a wireless communication system, comprising the steps of:
exchanging contact information with at least one further electronic equipment via near field communication, said contact information comprising a target address of the respective further electronic equipment within the wireless communication system and serving for communicating within the wireless communication system,
creating a group of contact information comprising at least the received contact information, whereby each contact information of the group relates to an electronic equipment,
setting up a communication within the wireless communication system to the group of electronic equipments in accordance with the group of contact information,
accepting an input of state of the electronic equipment via an input means, and
exchanging a type of contact information depending on the state of the electronic equipment.

* * * * *

UNITED STATES PATENT AND TRADEMARK OFFICE
CERTIFICATE OF CORRECTION

PATENT NO. : 8,412,098 B2
APPLICATION NO. : 11/912427
DATED : April 2, 2013
INVENTOR(S) : Fredrik Ramsten et al.

Page 1 of 1

It is certified that error appears in the above-identified patent and that said Letters Patent is hereby corrected as shown below:

In the Claims

Claim 17, col 8, line 55 should read --17. The method according to claim 16, comprising--.

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,412,098 B2  Page 1 of 1
APPLICATION NO. : 11/912427
DATED : April 2, 2013
INVENTOR(S) : Ramsten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1489 days.

Signed and Sealed this
First Day of September, 2015

Michelle K. Lee
*Director of the United States Patent and Trademark Office*